March 27, 1951  P. G. PALMGREN  2,546,473
SPINNING SPINDLE ASSEMBLY
Filed April 11, 1946
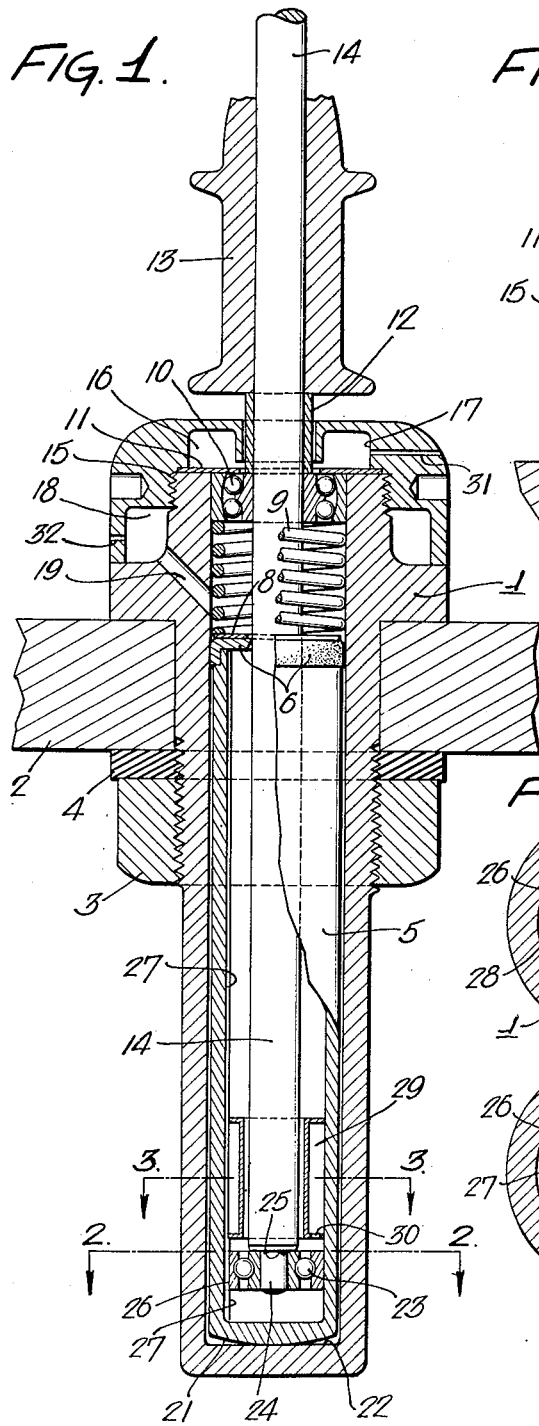
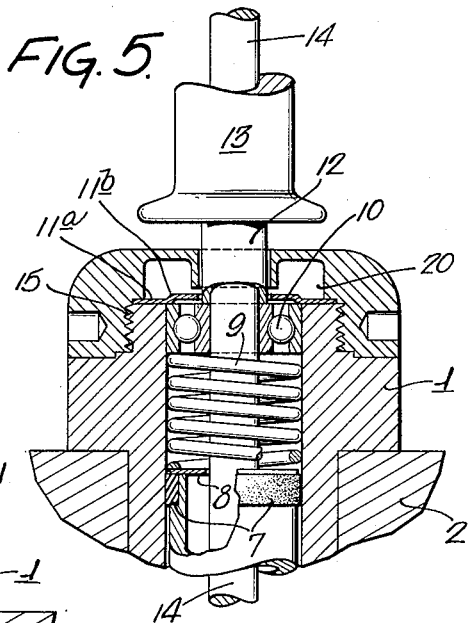
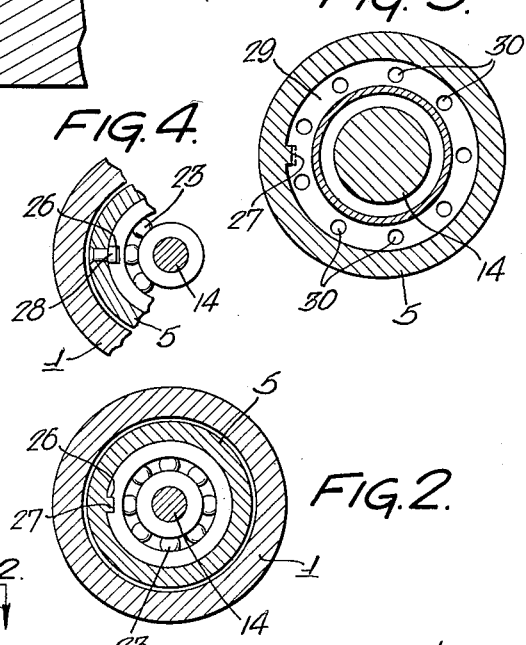
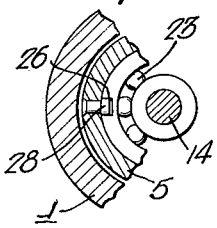
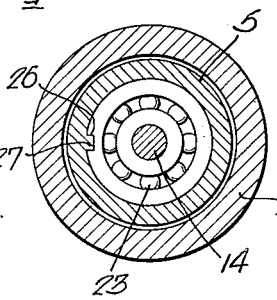
Inventor:
Per Gunnar Palmgren
by his Attorneys
Howson & Howson Patented Mar. 27, 1951

2,546,473

UNITED STATES PATENT OFFICE 2,546,473

SPINNING SPINDLE ASSEMBLY

Per Gunnar Palmgren, Philadelphia, Pa., assignor to SKF Industries, Inc., Philadelphia, Pa., a corporation of Delaware Application April 11, 1946, Serial No. 661,286

10 Claims. (Cl. 308—152)

This invention relates to improvements in spindles used for spinning textile materials such as yarn or thread.

Modern textile spindles must operate at speeds in the neighborhood of ten to eighteen thousand revolutions per minute and must run smoothly to produce a satisfactorily uniform product and to keep power consumption down to an economical level. Because of unbalance in some of the rotating parts, the spindle suffers vibration to such an extent when operating, that its reduction and control become the principal problems encountered in organizing the spindle assembly. The rotating parts really act as a gyroscope and hence the spindle tends to precess or, travel on a conical surface having its apex at the center of the upper bearing.

An object of the invention is to damp vibrational and precessional forces by rubbing the bottom of the bolster against the bottom of the plug, thus simplifying construction, saving parts, and permitting separation of the damping oil from the lower bearing and spindle space.

Another object is to provide a construction in which I can accommodate two standard anti-friction bearings large enough to endure for years under the loads encountered. This will save the additional costs of manufacturing and assembling bearings specialized in design to suit only a particular spindle.

Another object is to provide a rubber ring construction that is simple and inexpensive yet that will permit some angular re-alignment of the spindle axis to accommodate unbalance and thereby lessen vibration.

Another object is to seal the damping oil into a closed space to keep it from depletion and thus to maintain its action constant, and to keep it from entering the lower bearing and spindle space.

Another object is to arrange for feeding only a minute quantity of oil to the bearings to avoid friction loss from oil churning.

With these and other objects in view, the invention consists of a sealed unit comprising: a spindle, a whirl, a bolster, a plug, a cover closing the upper end of the plug, the cover having one or two chambers to carry grease or other absorbent material for example, felt, for lubricating the upper and/or lower bearings; a standard ball bearing mounted in the top of the plug adapted to assume all of the vertical load of the spindle and to permit the spindle to pivot about its center point; a spring compressed between the outer race of the above bearing and the top of the bolster, in order to press the latter against the bottom of the plug; a thin plate under the spring and over the ring of rubber, or other resilient material capable of sealing off the space between bolster and plug and also permitting the bolster to move sidewise without destroying its sealing properties; a standard anti-friction bearing at the lower end of the spindle arranged to react only horizontal loads, the outer race of the latter bearing in one embodiment being notched; and in one embodiment a circular chamber above the lower bearing to contain grease or other absorbent material for supplying a minute quantity of oil to it.

In the attached drawings:

Fig. 1 is a cross sectional view in elevation through the axis of the spindle, showing one embodiment of the invention;

Fig. 2 is a cross sectional view in plan on line 2—2, Fig. 1;

Fig. 3 is a cross sectional view in plan of the lower grease or felt reservoir on line 3—3;

Fig. 4 is a fragmentary plan view showing the use of a pin projecting into the notch in the outer race of the lower bearing in place of the rib on the inner wall of the bolster shown in Fig. 2, and Fig. 5 is a fragmentary sectional view illustrating a further modification within the scope of the invention.

The principal difficulty encountered in operation comes from the fact that the center of gravity of the bobbins and/or the materials wound upon them, always lies slightly to one side of the axis of the spindle. This condition exists because of the impracticability of making bobbins perfectly balanced dynamically, and of winding the material upon them, absolutely uniformly in positively centralized position.

Rotation of the spindle creates centrifugal force in the unbalanced package consisting of the textile material and bobbin, commensurate with the eccentric position of the center of gravity of the combined mass and with the speed. The condition will vary with each different package. This centrifugal force will pull the package to one side in a horizontal direction and tend to force the spindle to rotate off its axis. According to well-known principles of mechanics, vibration will occur in the spindle, varying in response to the amount of unbalance, flexibility of the spindles, rotational speed, and will reach its maximum disturbing value at the speed of natural vibration of the spindle, i. e., at the so-called "critical speed."

The rotating spindle really constitutes a gyroscope and therefore, the centrifugal force being at right angles to the axis, will act to make it overturn at right angles to the instantaneous direction of that force. Thus the spindle tends to move in a conical path whose apex is at the point of vertical support, i. e., the center of the upper bearing.

Naturally, the spindle will give the least vibrational trouble if allowed to travel as closely as possible in the path dictated by all the forces acting upon it. To keep the path within a practical range, a frictional force has been introduced at a distance below the vertical support so that the moment of this frictional force will oppose the precessional or gyroscopic force. This frictional moment acts only when created by the precessional force and so should counterbalance it nearly enough to bring the motion within a small range that will not disturb the winding operation. This requires an organization of parts, adjustment of pressures and resiliencies, that will check the unbalanced forces expected to occur in the various conditions met in service, to a sufficient degree to keep the operation smooth within a very small range.

Previous designers have used a whirl of large diameter with its center opposite the upper bearing to bring the pull of the tape opposite the center of that bearing and thus minimize the load thereon. This construction also utilizes the whirl as a partial closure for the open end of the plug. They have used either a plain journal or an anti-friction bearing in the upper position and a pivot or anti-friction bearing in the lower position. The anti-friction bearings were all especially designed and adapted only for use in a particular spindle and in all cases within my knowledge, were supported in the bolster. For damping vibration two devices were used. First, a frictional drag produced by pressure between two or more surfaces loaded by a spring and second, oil confined within a restricted space to provide resistance against horizontal motion. All of these designs used a multiplicity of parts and in one way or another employed the damping oil for lubrication of the lower bearing. In the latter arrangement considerable oil surrounded the lower part of the spindle and the lower bearing so that rotation of these parts causes a lot of churning, friction loss, and consequent increase in power consumption.

The present invention has come from the desire to reduce the unbalance as far as possible, to simplify the construction and eliminate unnecessary parts, to reduce the power consumption by reducing vibrational disturbances, and eliminating all churning of the damping oil, to produce a unitary, sealed construction, and to provide for lubrication of the bearings over a period of several years without requiring renewal of the supply or any maintenance attention.

To accomplish these objectives, I have placed a whirl of small diameter on the spindle above the upper bearing. Due to its small size, the latter part will likely have less unbalance and produce less disturbance in the air, and thus require less torque for turning. Though placement of the whirl in the over-hung position increases radial loads on the bearings, especially the upper one, I can select standard anti-friction bearings of sufficient capacity for the two locations because I have arranged to support the upper bearing in the bore of the plug itself and have increased the size of the bolster sufficiently to accommodate an adequate standard anti-friction bearing in the lower position, supported within the bolster. Such bearings will cost less, have greater capacity, and endure longer than the special bearings of previous designs. In Fig. 1 I have shown a self-aligning ball bearing in the upper position and a deep groove bearing in the lower position. The former bearing permits angular deviation of the spindle without effect upon the bearing; however, a deep groove bearing having slight internal looseness will permit similar misalignment of sufficient amount for this purpose without injury to the bearing, and a single row deep groove bearing of this character is shown in Fig. 5.

To introduce the necessary frictional drag, I have arranged to cause the rounded lower end of the bolster to rub against the flat bottom surface of the plug under compression of a coil spring placed between the outer race of the upper bearing and the top of the bolster.

To introduce the damping effect due to oil confined in a restricted space, I have arranged to place this oil in a narrow space surrounding the bolster and inside of the plug. In order to seal the oil within the space thus preventing depletion and also any possibility of its entering into the lower portion of the bolster, I have placed a ring around the top end of the bolster which fits snugly between the internal surface of the plug and a circumferential notch cut into the outer surface of the bolster. This ring, preferably of a synthetic rubber suitable for resistance to deterioration by oil, has sufficient resiliency to permit the necessary sidewise motion of the bolster without breaking the seal. It may be in the form of a simple cylindrical ring such as would be cut from a tube or it may be a shape formed to cover the open end of the bolster partially or completely. Above the rubber I have installed a thin metal plate to protect it against detrimental effects from the operation of the spring. To arrange for supplying minute quantities of oil, I have provided one or two reservoirs in the cover for grease or other absorbent material from which minute drops of oil will ooze slowly. This oil will drain through the clearances into the bearings.

Fig. 1 shows a cross sectional view in elevation of one embodiment of the spinning spindle which is the subject of this invention. The numeral 1 denotes the plug which will be attached to the rail 2 of the textile machine by nut 3 and if desirable the washer 4. The bolster 5 is placed within the plug in spaced relation thereto, being brought into centralized position therewith by means of the resilient rubber sealing ring shown as a molded ring 6. In Fig. 5 the sealing ring is shown as a simple section of cylindrical tubing 7. Above this a thin plate 8 of metal, having clearances around the spindle and inside the bore of the plug is placed to protect the rubber ring against the action of the coil spring 9 which is in compression between the plate and the outer race of the upper bearing 10. Another thin plate is placed over the top of the plug and the upper bearing to support the spring pressure and to enclose the space between the two race rings. It has a small clearance around a spacer sleeve 12 and is made in two slightly differing alternatives. It is shown in Figure 1 as a flat plate 11 and in Figure 5 as a flate plate 11a with slight offset 11b. The sleeve 12 spaces the whirl 13 from the upper bearing. The latter is attached to the spindle 14. A cover 1a attached to the upper end of the plug by a thread 15 constitutes an effective enclosure for the entire unit. It contains one or two circular grooves for storing grease or material that will retain oil. Figure 1 shows one alternative form of groove for storing such material to lubricate the upper bearing. It contains a space 16 having a cylindrical side wall 17 which acts to prevent the grease from contacting the rotating sleeve. Figure 1 also shows a second chamber 18 to hold grease for lubricating the lower bearing by drainage of leaking, or oozing, oil through a passage 19 in the plug. Figure 5 shows an alternative style of cover 1b which contains only one grease groove 20 open toward the rotating sleeve. The coil spring causes the rounded surface 21 of the bolster to press against the flat bottom 22 of the plug. The lower bearing 23 is mounted on a bearing seat 24 at the lower end of the spindle against a shoulder 25. A notch 26 cut into the outer race of the lower bearing engages a rib 27 projecting from the inner wall of the bolster. In an alternative arrangement, this notch engages a pin 28 projecting from one wall of the bolster. A circular chamber 29 may also be provided in the bolster constituting a reservoir for grease to lubricate the lower bearing, from which oil may leak through holes 30 in the lower wall thereof. When placing in the lubricating reservoirs, oil absorbent material other than grease, I also provide very small holes 31 and 32, in the walls of these reservoirs through which to pass a hypodermic needle for replenishing the oil.

The intention is to supply this assembly as a unit to the textile mill operator who will find it easy to install. It is assembled and sealed at the factory as follows: a measured quantity of oil is first poured into the plug after which the bolster is put in. This causes the oil to fill or nearly fill the space between bolster and plug. The rubber ring is then installed to seal the oil within the space, the protecting plate and coil spring being placed above it. Next the whirl, the spacer sleeve, and the upper bearing are mounted on the spindle, the whirl and the inner race of the bearing having a press fit. The inner race of the lower bearing is also mounted with a press fit. After supplying grease to the chamber or chambers in the cover, this unit is installed in the plug and bolster, the outer race of the upper bearing having a slight clearance in the bore of the plug and the outer race of the lower bearing a greater clearance in the bore of the bolster. Instead of grease, I may place in the chambers, a piece cut in proper shape to fit, consisting of felt or other sponge-like material capable of retaining a quantity of oil that will escape in minute amounts. As the cover is screwed down, the spring is compressed between the outer race of the upper bearing and the plate above the sealing ring. In the alternative in which the cover has but one grease chamber, a quantity of grease, or other absorbent material, may be placed inside of the space within the spring and above the plate resting on the sealing ring.

As previously explained, the spindle becomes a gyroscope which precesses in a conical path around the center of the upper bearing, as soon as it starts to turn with the bobbin installed. The dimensions of the conical path will depend upon the amount of unbalance in the bobbin and in the material wound upon it, the effect of the latter varying as the winding continues. In order to produce a uniformly satisfactory product, it is desirable to restrict this motion to as small a range as possible. This I accomplish by providing a frictional damping force through the rubbing action between the lower rounded end of the bolster and the flat bottom of the plug. The amount of this frictional drag may be controlled by the amount of compression in the coil spring. Too great a drag will increase the ill effects of vibration since it tends to prevent the spindle from following its natural path, while too light a pressure will allow too great a range of movement. The pressure may range from one to ten pounds according to spindle size. As the bolster moves in its conical path, it must push aside the oil entrapped in the space between bolster and plug. This also has a damping effect of about the same value as the frictional drag. As the spindle speeds up from rest to its maximum operating speed, it passes through a range in which vibration becomes excessive due to the fact that the vibrational period of the unbalanced parts corresponds with the period of natural vibration of the spindle. At higher speeds, the vibration will decrease considerably but will not disappear completely. It is desirable to adjust the damping effects so that these vibrations, especially at operating speed, will be kept down to a very small amount.

Practical tests show that the organization which is the subject of this invention, operates at higher speeds, with less vibrational disturbance than previous designs. Power loss also averages less in amount.

Antifriction bearings require only a very small quantity of oil to lubricate the contact areas wherein slight sliding occurs, and to protect the surfaces against corrosion. Consequently, such bearings will run for years without deterioration, if supplied with only minute amounts of oil from time to time, in addition to the original supply. This applies particularly to bearings under the light loads existing in spinning spindles. To feed such minute quantities of oil, I place grease, or oil absorbent material, in a reservoir separate from the bearing space, and arrange the construction so that the small drops which ooze out of it, will find their way to the bearings. Greater quantities of oil not only are unnecessary, but detrimental in proportion to the excess, because the churning increases power loss. In previous designs, large amounts of damping oil surround the lower spindle and bearing. Power is saved in this invention by keeping the damping oil entirely away from these parts.

I claim:

1. In a spinning spindle assembly a hollow plug, a spindle mounted in said plug, a bolster in the plug housing the lower end of the spindle said bolster seated in the lower end and having clearance with the side wall of said plug so as to afford freedom for lateral movement of the bolster in the plug, an anti-friction bearing for said spindle in the upper end of the plug, said bearing having outer and inner race rings, a second bearing for said spindle in the lower end of the bolster, a spring confined between the outer race ring of the first-named bearing and the upper end of the bolster and exerting pressure against the said seat in the lower end of the plug, and means for immobilizing the said outer ring against the thrust of said spring.

2. A spinning spindle assembly as defined in claim 1 wherein the bearing first named includes a spherical outer raceway affording self-aligning properties.

3. In a spinning spindle assembly a hollow plug, a spindle mounted in said plug, a bolster in the plug housing the lower end of the spindle, said bolster seating in the lower end and having clearance with the side wall of said plug so as to afford freedom for lateral movement of the bolster in the plug, said clearance space containing oil as a means for damping the said lateral movements of the bolster in the plug, an antifriction bearing for said spindle in the upper end of the plug, a second bearing for said spindle in the lower end of the bolster, a spring confined between the first-named bearing and the upper end of the bolster and exerting pressure tending to force the bolster against the said seat in the lower end of the plug, and means at the upper end of the bolster for sealing the clearance space between the bolster and the confronting surfaces of the plug.

4. In a spinning spindle assembly, a hollow plug, a spindle mounted in said plug, a bolster in the plug housing the lower end of the spindle, said bolster seating in the lower end and having a clearance with the side wall of said plug so as to afford freedom for lateral movement of the bolster in the plug, a bearing for said spindle in the upper end of the plug, a second bearing for said spindle in the lower end of the bolster, and means for damping the said lateral movements of the bolster in the plug, said damping means consisting of a body of oil within the space between the bolster and the confronting surfaces of the plug, and a seal above the said body of oil for confining the oil in said space.

5. In a spinning spindle assembly, a hollow plug, a spindle mounted in said plug and projecting upwardly from the top of the latter, a bolster in the plug embracing the lower end of the spindle, said bolster seating in the lower end of the plug and having clearance with the side wall of the latter affording freedom for lateral movement of the bolster in the plug, a radial bearing in said bolster for the lower end of the spindle, a bearing at the upper end of the plug forming a fulcrum for the spindle, a detachable cap enclosing the upper bearing and containing a chamber for lubricant communicating with said bearing, and means for damping the said lateral movements of the bolster in the plug.

6. In a spinning spindle assembly, a hollow plug, a spindle mounted in said plug and projecting upwardly from the top of the latter, a bolster in the plug embracing the lower end of the spindle, said bolster seating in the lower end of the plug and having clearance with the side wall of the latter affording freedom for lateral movement of the bolster in the plug, a radial bearing in said bolster for the lower end of the spindle, a bearing at the upper end of the plug forming a fulcrum for the spindle, a detachable cover containing separate lubricant chambers having communication respectively with the said upper and lower bearings, and means for damping the said lateral movements of the bolster in the plug.

7. In a spinning spindle assembly a hollow plug, a spindle mounted in said plug, a bolster in the plug housing the lower end of the spindle, said bolster seating in the lower end and having clearance with the side wall of said plug so as to afford freedom for lateral movement of the bolster in the plug, an antifriction bearing for said spindle in the upper end of the plug, a second anti-friction bearing for said spindle in the lower end of the bolster, said bearings having outer and inner race rings, a spring confined between the outer race ring of the first-named bearing and the upper end of the bolster and exerting pressure tending to force the bolster against the said seat in the lower end of the plug, the inner race rings of said bearings being fixed to the spindle and the outer race rings being free for movement axially in the plug and bolster respectively, and means for immobilizing the outer race ring of the upper bearing against the thrust of said spring.

8. A spinning spindle according to claim 7 wherein means is provided for preventing rotation of the outer race ring of the lower bearing in the bolster.

9. In a spinning spindle assembly, a hollow plug, a spindle mounted in said plug, a bolster in the plug housing the lower end of the spindle, said bolster seating in the lower end and having clearance with the said wall of said plug so as to afford freedom for lateral movement of the bolster in the plug, a bearing for said spindle in the upper end of the plug, a detachable cover for the plug, a bearing retaining abutment, a spring seating against the upper end of the bolster and resiliently supporting the upper bearing against said abutment, said spring being normally under compression and exerting pressure to forcible press the bolster to its seat in the lower end of the plug, and a second bearing for said spindle in the lower end but above the bottom of the bolster and movable axially in the latter, said bearings being fixed to the spindle.

10. A spinning spindle assembly as defined in claim 1 wherein the bearing first named is of a character to permit limited oscillatory movement of the spindle about a center in the bearing.

PER GUNNAR PALMGREN.

REFERENCES CITED

The following references are of record in the file of this patent:

UNITED STATES PATENTS

| Number | Name | Date |
|---|---|---|
| 355,656 | Northrop | Jan. 4, 1887 |
| 442,427 | Draper | Dec. 9, 1890 |
| 493,034 | Klots | Mar. 7, 1893 |
| 1,124,476 | Lerch | Jan. 12, 1915 |
| 2,168,247 | Staufert | Aug. 1, 1939 |
| 2,169,587 | Magrath | Aug. 15, 1939 |
| 2,350,272 | Cobb | May 30, 1944 |